Feb. 7, 1961

E. E. MALLORY ET AL 2,970,341

EXTRUDER WITH ADJUSTABLE CHOKE

Filed Nov. 27, 1957

INVENTORS
EDWIN E. MALLORY,
EUGENE E. HESTON,
ROBERT H. KLINE &
RAYMOND L. CHRISTY.

BY Oberlin & Limbach, ATTORNEYS.

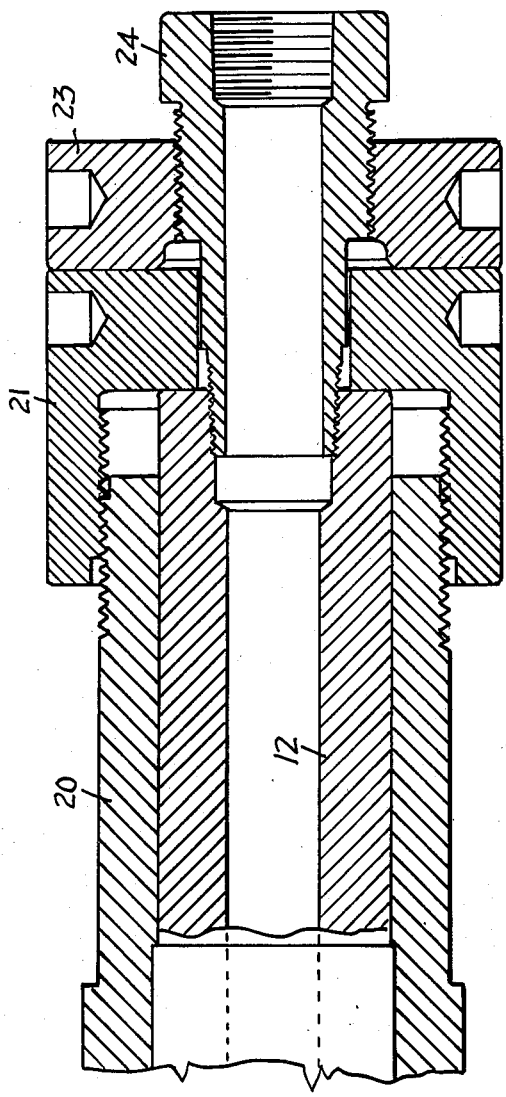
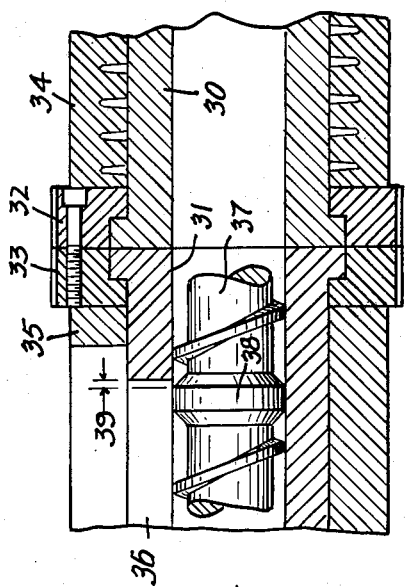
Fig. 3
Fig. 4
INVENTORS
EDWIN E. MALLORY,
EUGENE E. HESTON,
ROBERT H. KLINE &
RAYMOND L. CHRISTY
BY Oberlin & Limbach, ATTORNEYS.

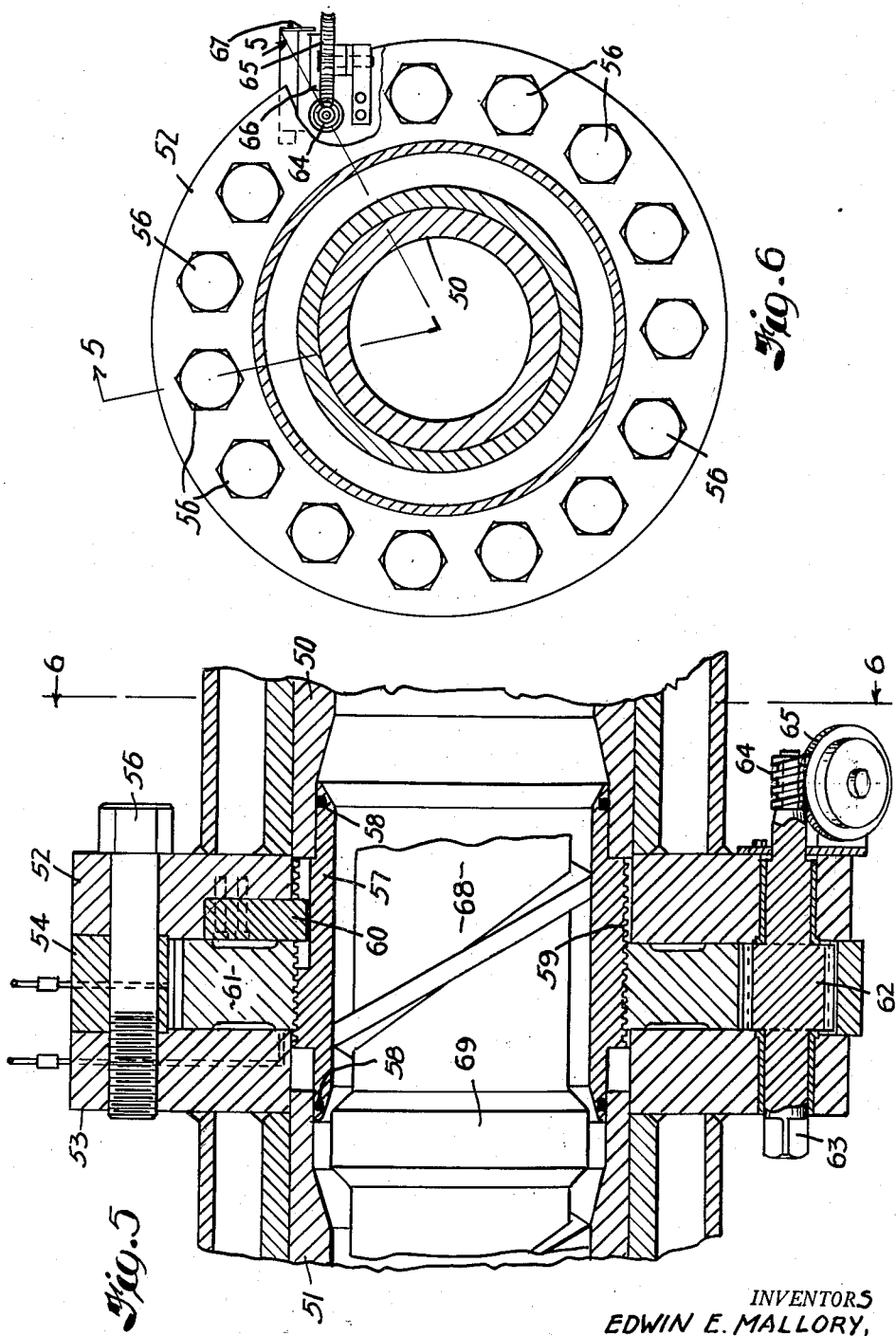

United States Patent Office 2,970,341
Patented Feb. 7, 1961

2,970,341

EXTRUDER WITH ADJUSTABLE CHOKE

Edwin E. Mallory, Cuyahoga Falls, and Eugene E. Heston, Robert H. Kline, and Raymond L. Christy, Akron, Ohio, assignors to National Rubber Machinery Company, Akron, Ohio, a corporation of Ohio Filed Nov. 27, 1957, Ser. No. 699,357

8 Claims. (Cl. 18—12)

The present invention relates generally to an extruder for thermoplastic or like material that is provided with an adjustable choke effective to build up the required back pressure on the material being extruded and to control flow from one zone to the next.

Hitherto, in screw-type extruders it has been known to provide a screw-type extruder that has a longitudinally adjustable feed screw equipped with a frusto-conical surface cooperable with a complementary surface of the cylinder to define an adjustable valve, such valve being readily adjustable to vary the back pressure of the material in the cylinder portion thereahead simply by longitudinally moving the feed screw. For examples of this general type of adjustable valve see the patents to Allen L. Heston, Pat. No. 2,449,652, dated September 21, 1948, and Eugene E. Heston Re. 23,880, reissued September 28, 1954. An advantage of this form of adjustable choke arrangement is that it may be located ahead of the cylinder vent through which gases from the material are released, such location of the choke also serving to cause buildup of back pressure on the material in the early stages of the extruding process thereby resulting in more efficient valving of the material.

It is a principal object of this invention to provide a simple and efficient form of screw-type extruder that is characterized by its uniform diameter feed screw and cylinder, the adjustable choke passage being defined between a circular rib of the axially adjustable feed screw cooperating with the edge of an enlargement in the cylinder.

It is another object of this invention to provide a screw-type extruder in which the adjustable choke aforesaid is formed by such circular rib of the feed screw and an undercut ring that is clamped between juxtaposed cylinder sections.

It is another object of this invention to provide a screw-type extruder in which the adjustable choke aforesaid is formed by such circular rib of the feed screw and that edge of the cylinder vent that is nearest to the cylinder feed opening.

It is another object of this invention to provide a screw-type extruder in which the adjustable choke aforesaid is formed by such circular rib of the feed screw and a screw adjusted ring that is mounted between successive cylinder secitons and that obviates the necessity of axially adjusting the feed screw in the cylinder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

Fig. 3 is an enlarged fragmentary cross-section view showing the mechanism for axially adjusting the feed screw in Fig. 1;

Fig. 4 is a fragmentary cross-section view of a modification in which the choke passage is defined by a circular rib formed on the feed screw and the edge of a vent opening provided in the cylinder or barrel of the extruder;

Fig. 5 is a fragmentary cross-section view on enlarged scale showing another form of structure in which an axially adjustable ring forms an adjustable choke passage with a circular rib formed on an axially shaped feed screw; and Fig. 6 is a cross-section partially cut-away view taken substantially along the line 6—6, Fig. 5.

Figure 1:
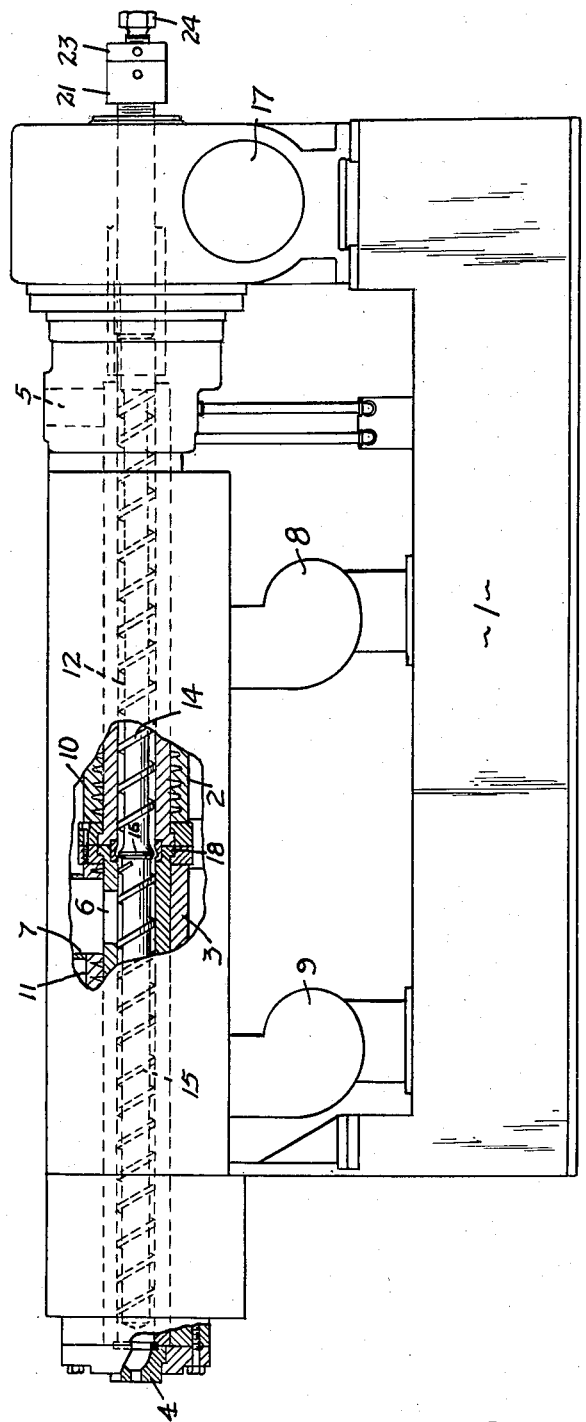
Fig. 1 is a side elevation view, partly in cross-section, showing one form of extruder provided with an adjustable choke according to this invention.

Referring first to Fig. 1, the extruder as a whole is designated by the reference numeral 1 and, as shown, the cylinder or barrel thereof is made up of adjacent sections 2 and 3, there being a die 4 secured at the end of section 3 and there being a feed opening 5 adjacent the end of the section 2. Adjacent the joint between said sections 2 and 3 the latter is formed with a vent opening 6 which communicates with a vacuum box 7, or the like, which is operative to draw off gases or volatile matter from the material which is worked and fed through the cylinder.

Blowers 8 and 9 are provided for circulating temperature modifying medium through the respective grooved heat transfer jackets 10 and 11.

Rotatable within the cylinder assembly is a feed screw 12 provided with helical ribs 14 and 15, and if desired, the hub of the feed screw within section 3 may be of larger diameter than the hub which is within the section 2 so that the material will be thinner as it flows from right to left toward the die 4 wherby it will be effectively plasticized and will allow gases and volatiles to escape through the vent opening 6.

Between the ends of said feed screw 12 there is a circular rib 16 which is disposed ahead of the vent opening 6. The feed screw is rotated in the cylinder assembly as by a motor drive 17.

Clamped between the cylinder sections 2 and 3 and surrounding the circular rib 16 of the feed screw 12 is an undercut ring 18. It can be seen that at different longitudinal positions of the feed screw 12 with respect to the ring 18 there will be defined between the undercut of the ring and the circular rib 16 an adjustable choke passage which serves to build up pressure on the material in the portion of the extruder within the section 2.

Longitudinal adjustment of the feed screw 12 is provided as by means of mechanism that is clearly disclosed in Fig. 3, there being a drive quill 20 on which is threaded a nut 21 which is disposed between the end of the feed screw 12 and a jam nut 23, the latter of which has threaded engagement with a fitting 24 that is screwed tightly into the end of the feed screw 12. Thus, when the jam nut 23 is loosened slightly the nut 21 may be turned in either direction, as desired, to move the feed screw 12 forwardly or rearwardly. The feed screw 12 is locked in the desired longitudinally adjusted position by tightening the jam nut against the nut 21.

Figure 2:
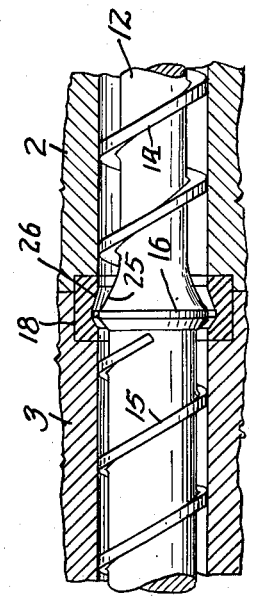
Fig. 2 is an enlarged fragmentary cross-section view showing the adjustable choke of the Fig. 1 embodiment.

By reference to Fig. 2 it can be seen that the frusto-conical surfaces 25 and 26 of the rib 16 and of the ring 18 define a choke passage that is of progressively less radial width through which the material being extruded must pass when fed and worked by the rotation of the feed screw 12 inside the cylinder sections 2 and 3. It can be seen that when the feed screw 12 is moved toward the right, as viewed in Fig. 2, the flow passage between the surfaces 25 and 26 becomes progressively smaller to thus cause a build-up of a progressively increasing pressure in the cylinder section 2. The circular rib 16 is preferably of diameter approximately equal to the bores in the respective cylinder sections 2 and 3 and is of diameter corresponding to the outside diameters of the helical ribs 14 and 15.

Referring now to the embodiment of the invention illustrated in Fig. 4, the same comprises cylinder sections 30 and 31 that are clamped together in abutting relation by means of the clamping rings 32 and 33. Surrounding the respective cylinder sections 30 and 31 are the jackets 34 and 35. The cylinder section 31 is formed with a vent 36 through the wall thereof which is adapted to be communicated with a vent box (not shown), whereby volatile matter or gas bubbles in the plastic material will be released or drawn out.

Rotatable within the cylinder sections 30 and 31 is a feed screw 37 which is formed with a circular rib 38 between its ends. As apparent, axial adjustment of the feed screw 37 will vary the size of the choke passage as defined between the right-hand edges of the vent 36 and of the rib 38. In Fig. 4 the width of the choke passage is designated by the reference numeral 39. The said screw 37 may be arranged for axial shifting in the cylinder assembly by mechanism such as illustrated in detail in Fig. 3.

In the embodiment of the invention illustrated in Figs. 5 and 6 there is provided aligned cylinder assemblies 50 and 51 provided with radially extending flanges 52 and 53 with an intervening spacer ring 54 between said flanges. The cylinder assemblies 50 and 51 are clamped together in coaxial relation as by means of the circularly arranged series of bolts 56.

Between said cylinder assemblies 50 and 51 is a ring 57 which has its end portions axially slidably fitted into the counterbored ends of said cylinder assemblies 50 and 51. O-rings, or equivalent packing rings 58, are employed to seal the sliding joints between said ring 57 and the respective cylinder assemblies 50 and 51. The ring 57 is formed with external threads 59 and is held against rotation as by means of a key 60 that is mounted on the flange 52 and that extends into a longitudinal groove formed in said ring 57.

An internally threaded gear 61 has threaded engagement with the threads 59 of the ring 57, said gear 61 being rotatably but axially fixedly disposed between the flanges 52 and 53 and is disposed inside the spacer ring 54. A pinion 62 is rotatably supported by the flanges 52 and 53 and has its teeth in mesh with the teeth of the gear 61. Said pinion 62 is provided at one end with a stem 63 by which said pinion 62 may be turned in either direction to thereby rotate the nut or gear 61 to cause the ring 57 to shift axially toward the right or toward the left.

The other end of the shaft for the pinion 62 is formed with a worm 64 which meshes with a worm wheel 65. The hub 66 of said worm wheel 65 may be provided with appropriate markings to cooperate with a pointer 67. Thus, the machine operator can tell by such markings the precise axial position of the ring 57 between the cylinder assemblies 50 and 51.

Rotatable within the extruder is a feed screw 68 which is formed with a circular rib 69 which is of diameter approximately equal to the diameter of the cylinder bore. As best shown in Fig. 5, the cylinder is formed with an annular enlargement as defined by the counterbore in the cylinder assembly 51 and the left-hand end portion of the ring 57. Said enlargement surrounds the rib 69 of the feed screw 68 and is of axial length greater than the axial length of the rib 69. Accordingly, when the ring 57 is shifted axially toward the left, as viewed in Fig. 5, the plastic material is forced to flow through a progressively decreasing choke passage whereby the back pressure on the material in the cylinder assembly 50 is progressively built up. On the other hand, when the ring 57 is shifted axially toward the right such passage becomes progressively larger in size with consequent less build up of pressure on the material ahead of the choke passage. Preferably, the inside diameter of the ring 57 is of approximately the same diameter as the cylinder bore and as the circular rib 69 so that in effect the flow of plastic material may be substantially cut off when the ring 57 is shifted axially all the way to the left.

Other modes of applying the principle of the invention may be employed, change being made as regards the details described, provided the features stated in any of the following claims, or the equivalent of such, be employed.

We therefore particularly point out and distinctly claim as our invention:

1. An extruder for plastic and like material comprising a cylinder; a feed screw rotatable in said cylinder and formed with a hub and with a helical flight therearound to feed plastic material from one end toward the other end of said cylinder; and an adjustable choke between the ends of said cylinder and feed screw providing a choke passage of variable size through which the material flows as it is fed through the cylinder to thereby build up a desired back pressure on the material ahead of said choke passage; said adjustable choke comprising a lateral enlargement of the cylinder bore that intersects such bore at axially spaced regions, a circular rib around the hub of said feed screw disposed between said regions that is of diameter approximately equal to that of the cylinder bore and of the adjacent flight portions of said feed screw whereby said feed screw may be axially withdrawn from either end of said cylinder and of axial length that is less than the distance between said regions, and means for relatively axially shifting said rib and enlargement to vary the size of the choke passage as defined between an edge of said rib and one of said regions.

2. An extruder for plastic and like material comprising a cylinder; a feed screw rotatable in said cylinder and formed with a hub and with a helical flight therearound to feed plastic material from one end toward the other end of said cylinder; and an adjustable choke between the ends of said cylinder and feed screw providing a choke passage of variable size through which the material flows as it is fed through the cylinder to thereby build up a desired back pressure on the material ahead of said choke passage; said adjustable choke comprising a lateral enlargement of the cylinder bore that intersects such bore at axially spaced regions, a circular rib around the hub of said feed screw that is of diameter approximately equal to that of the cylinder bore and of the adjacent flight portions of said feed screw whereby said feed screw may be axially withdrawn from either end of said cylinder and of axial length that is less than the distance between said regions, and means for relatively axially shifting said rib and enlargement to vary the size of the choke passage as defined between an edge of said rib and one of said regions, said enlargement comprising a ring that is axially fixedly mounted in said cylinder and that is formed with an annular undercut about said rib having oppositely tapered ends, said rib also having oppositely tapered sides to provide for smooth flow thereover and through said enlargement and being axially shifted with respect to said ring to vary the size of the choke passage.

3. The extruder of claim 1 wherein said enlargement comprises a lateral cylinder vent, and wherein said rib is axially shifted with respect to the upstream region of said vent to vary the size of the choke passage.

4. An extruder for plastic and like material comprising a cylinder having a bore of substantially uniform diameter from end to end except for a lateral enlargement between its ends that intersects such bore at axially spaced regions; a feed screw rotatable in said cylinder and formed with a circular rib therearound and opposite such enlargement between said regions thereof, said rib being of approximately the same diameter as such bore and being of axial length less than that the axial distance between said regions of such enlargement whereby material that is fed longitudinally through said cylinder may flow over said rib and through such enlargement, said feed screw further being formed with helical ribs of diameter approximately equal to that of hte cylinder bore and being effective, upon rotation of said feed screw to longitudinally feed plastic material from one end toward the other end of said cylinder via the choke passage as defined by said rib and enlargement; and means for relatively axially shifting said rib and enlargement to vary the size of the choke passage and thus to vary the back pressure that is built up on the material ahead of the choke passage.

5. An extruder for plastic and like material comprising a cylinder; a feed screw rotatable in said cylinder to feed plastic material from one end toward the other end of said cylinder; and an adjustable choke between the ends of said cylinder and feed screw providing a choke passage of variable size through which the material flows as it is fed through the cylinder to thereby build up a desired back pressure on the material ahead of said choke passage; said adjustable choke comprising a lateral enlargement of the cylinder bore that intersects such bore at axially spaced regions, a circular rib on said feed screw that is of diameter approximately equal to that of the cylinder bore and of axial length that is less than the distance between said regions, and means for relatively axially shifting said rib and enlargement to vary the size of the choke passage as defined between an edge of said rib and one of said regions, said enlargement in part comprising the end surface of a ring that is axially slidable in a counterbore in said cylinder, said last-named means being operative to axially shift said ring to move its end surface axially closer to or farther away from said rib to vary the size of the choke passage.

6. The extruder of claim 5 wherein said ring is externally threaded, and wherein said last-named means comprises an axially fxed nut having threaded engagement with said ring, and means for rotating said nut.

7. An extruder for plastic and like material comprising a cylinder having a bore of substantially uniform diameter from end to end except for a lateral enlargement between its ends; a feed screw rotatable in said cylinder and formed with a circular rib around the opposite such enlargement, said rib being of approximately the same diameter as such bore and being of axial length less than that of such enlargement whereby material that is fed longitudinally through said cylinder may flow over said rib and through such enlargement, said feed screw further being formed with helical ribs of diameter approximately equal to that of the cylinder bore and being effective, upon rotation of said feed screw to longitudinally feed plastic material from one end toward the other end of said cylinder via the choke passage as defined by said rib and enlargement; and means for relatively axially shifting said rib and enlargement to vary the size of the choke passage and thus to vary the back pressure that is built up on the material ahead of the choke passage, said enlargement in part comprising the end surface of a ring that is axially slidable in a counterbore in said cylinder, and said last-named means being operative to axially shift said ring to move its end surface axially closer to or farther away from said rib to vary the size of the choke passage.

8. The extruder of claim 7 wherein said ring is externally threaded, and wherein said last-named means comprises an axially fixed nut having threaded engagement with said ring, and means for rotating said nut.

References Cited in the file of this patent

UNITED STATES PATENTS

| | | |
|---|---|---|
| 2,246,149 | Troche et al. | June 17, 1941 |
| 2,595,455 | Heston | May 6, 1952 |
| 2,705,131 | Ross et al. | Mar. 29, 1955 |
| 2,770,836 | Hankey | Nov. 20, 1956 |

FOREIGN PATENTS

| | | |
|---|---|---|
| 682,543 | Great Britain | Nov. 12, 1952 |
| 734,182 | Great Britain | July 27, 1955 |